(12) United States Patent
Capp et al.

(10) Patent No.: US 11,075,518 B2
(45) Date of Patent: Jul. 27, 2021

(54) POWER CONVERTER FOR A SOLAR PANEL

(71) Applicant: Solaredge Technologies Ltd., Herzeliya (IL)

(72) Inventors: F. William Capp, Boston, MA (US); William J. Driscoll, Westford, MA (US)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 17/153,454

(22) Filed: Jan. 20, 2021

(65) Prior Publication Data

US 2021/0143636 A1    May 13, 2021

Related U.S. Application Data

(63) Continuation of application No. 16/162,574, filed on Oct. 17, 2018, now Pat. No. 10,910,834, which is a
(Continued)

(51) Int. Cl.
*H02J 7/00* (2006.01)
*H02J 7/14* (2006.01)
*H02J 1/00* (2006.01)
*H02J 7/35* (2006.01)
*H02M 3/04* (2006.01)
*H02M 7/44* (2006.01)
*H02J 3/38* (2006.01)
*H02M 1/00* (2006.01)

(52) U.S. Cl.
CPC .............. *H02J 1/00* (2013.01); *H02J 3/383* (2013.01); *H02J 7/35* (2013.01); *H02M 3/04* (2013.01); *H02M 7/44* (2013.01); *H02J 3/38* (2013.01); *H02M 1/0077* (2021.05); *Y02E 10/56* (2013.01)

(58) Field of Classification Search
USPC ........................................................ 320/101
See application file for complete search history.

(56) References Cited

U.S. PATENT DOCUMENTS 4,161,771 A    7/1979   Bates
4,257,087 A    3/1981   Cuk
(Continued)

FOREIGN PATENT DOCUMENTS

AU    2073800 A    9/2000
CA    2063243 A1   12/1991
(Continued)

OTHER PUBLICATIONS

International Search Report from PCT/US04/16668, form PCT/ISA/220, filing date May 27, 2004.
(Continued)

*Primary Examiner* — Alexis B Pacheco
(74) *Attorney, Agent, or Firm* — Banner & Witcoff, Ltd.

(57) ABSTRACT

A solar array power generation system includes a solar array electrically connected to a control system. The solar array has a plurality of solar modules, each module having at least one DC/DC converter for converting the raw panel output to an optimized high voltage, low current output. In a thither embodiment, each DC/DC converter requires a signal to enable power output of the solar modules.

27 Claims, 3 Drawing Sheets

Related U.S. Application Data continuation of application No. 15/052,633, filed on Feb. 24, 2016, now Pat. No. 10,135,241, which is a continuation of application No. 13/282,037, filed on Oct. 26, 2011, now Pat. No. 9,438,035, which is a continuation of application No. 10/556,764, filed as application No. PCT/US2004/016668 on May 27, 2004, now Pat. No. 8,102,144.

(60) Provisional application No. 60/473,749, filed on May 28, 2003.

(56) References Cited

U.S. PATENT DOCUMENTS

| | | | |
|---|---|---|---|
| 4,453,207 | A | 6/1984 | Paul |
| 4,580,090 | A | 4/1986 | Bailey et al. |
| 4,652,770 | A | 3/1987 | Kumano |
| 4,685,040 | A | 8/1987 | Steigerwald et al. |
| 4,819,121 | A | 4/1989 | Saito et al. |
| RE33,057 | E | 9/1989 | Clegg et al. |
| 4,899,269 | A | 2/1990 | Rouzies |
| 5,001,415 | A | 3/1991 | Watkinson |
| 5,027,051 | A | 6/1991 | Lafferty |
| 5,268,832 | A | 12/1993 | Kandatsu |
| 5,280,232 | A | 1/1994 | Kohl et al. |
| 5,327,071 | A | 7/1994 | Frederick et al. |
| 5,501,083 | A | 3/1996 | Kim |
| 5,513,075 | A | 4/1996 | Capper et al. |
| 5,548,504 | A | 8/1996 | Takehara |
| 5,604,430 | A | 2/1997 | Decker et al. |
| 5,644,219 | A | 7/1997 | Kurokawa |
| 5,659,465 | A | 8/1997 | Flack et al. |
| 5,684,385 | A | 11/1997 | Guyonneau et al. |
| 5,686,766 | A | 11/1997 | Tamechika |
| 5,747,967 | A | 5/1998 | Muljadi et al. |
| 5,751,133 | A | 5/1998 | Sato et al. |
| 5,793,184 | A | 8/1998 | O'Connor |
| 5,801,519 | A | 9/1998 | Midya et al. |
| 5,838,148 | A | 11/1998 | Kurokami et al. |
| 5,869,956 | A | 2/1999 | Nagao et al. |
| 5,923,100 | A | 7/1999 | Lukens et al. |
| 5,923,158 | A | 7/1999 | Kurokami et al. |
| 5,932,994 | A | 8/1999 | Jo et al. |
| 5,949,668 | A | 9/1999 | Schweighofer |
| 5,986,909 | A | 11/1999 | Hammond et al. |
| 5,990,659 | A | 11/1999 | Frannhagen |
| 6,002,603 | A | 12/1999 | Carver |
| 6,046,919 | A | 4/2000 | Madenokouji et al. |
| 6,058,035 | A | 5/2000 | Madenokouji et al. |
| 6,093,885 | A | 7/2000 | Takehara et al. |
| 6,111,188 | A | 8/2000 | Kurokami et al. |
| 6,111,391 | A | 8/2000 | Cullen |
| 6,166,455 | A | 12/2000 | Li |
| 6,169,678 | B1 | 1/2001 | Kondo et al. |
| 6,175,512 | B1 | 1/2001 | Hagihara et al. |
| 6,225,793 | B1 | 5/2001 | Dickmann |
| 6,255,804 | B1 | 7/2001 | Herniter et al. |
| 6,262,558 | B1 | 7/2001 | Weinberg |
| 6,268,559 | B1 | 7/2001 | Yamawaki |
| 6,281,485 | B1 | 8/2001 | Siri |
| 6,311,137 | B1 | 10/2001 | Kurokami et al. |
| 6,320,769 | B2 | 11/2001 | Kurokami et al. |
| 6,369,461 | B1 | 4/2002 | Jungreis et al. |
| 6,369,462 | B1 | 4/2002 | Siri |
| 6,429,621 | B1 | 8/2002 | Arai |
| 6,433,522 | B1 | 8/2002 | Siri |
| 6,448,489 | B2 | 9/2002 | Kimura et al. |
| 6,465,910 | B2 | 10/2002 | Young et al. |
| 6,509,712 | B1 | 1/2003 | Landis |
| 6,515,215 | B1 | 2/2003 | Mimura |
| 6,515,217 | B1 | 2/2003 | Aylaian |
| 6,528,977 | B2 | 3/2003 | Arakawa |
| 6,545,211 | B1 | 4/2003 | Mimura |
| 6,560,131 | B1 | 5/2003 | vonBrethorst |
| 6,587,051 | B2 | 7/2003 | Takehara et al. |
| 6,628,011 | B2 | 9/2003 | Droppo et al. |
| 6,650,031 | B1 | 11/2003 | Goldack |
| 6,657,419 | B2 | 12/2003 | Renyolds |
| 6,664,762 | B2 | 12/2003 | Kutkut |
| 6,678,174 | B2 | 1/2004 | Suzui et al. |
| 6,690,590 | B2 | 2/2004 | Stamenic et al. |
| 6,765,315 | B2 | 7/2004 | Hammerstrom et al. |
| 6,800,964 | B2 | 10/2004 | Beck |
| 6,801,442 | B2 | 10/2004 | Suzui et al. |
| 6,809,942 | B2 | 10/2004 | Madenokouji et al. |
| 6,810,339 | B2 | 10/2004 | Wills |
| 6,838,611 | B2 | 1/2005 | Kondo et al. |
| 6,838,856 | B2 | 1/2005 | Raichle |
| 6,844,739 | B2 | 1/2005 | Kasai et al. |
| 6,850,074 | B2 | 2/2005 | Adams et al. |
| 6,897,370 | B2 | 5/2005 | Kondo et al. |
| 6,914,418 | B2 | 7/2005 | Sung |
| 6,919,714 | B2 | 7/2005 | Delepaut |
| 6,966,184 | B2 | 11/2005 | Toyomura et al. |
| 6,984,970 | B2 | 1/2006 | Capel |
| 6,987,444 | B2 | 1/2006 | Bub et al. |
| 7,030,597 | B2 | 4/2006 | Bruno et al. |
| 7,031,176 | B2 | 4/2006 | Kotsopoulos et al. |
| 7,042,195 | B2 | 5/2006 | Tsunetsugu et al. |
| 7,045,991 | B2 | 5/2006 | Nakamura et al. |
| 7,046,531 | B2 | 5/2006 | Zocchi et al. |
| 7,053,506 | B2 | 5/2006 | Alonso et al. |
| 7,087,332 | B2 | 8/2006 | Harris |
| 7,126,294 | B2 | 10/2006 | Minami et al. |
| 7,158,395 | B2 | 1/2007 | Deng et al. |
| 7,161,082 | B2 | 1/2007 | Matsushita et al. |
| 7,259,474 | B2 | 8/2007 | Blanc |
| 7,336,004 | B2 | 2/2008 | Lai |
| 7,339,287 | B2 | 3/2008 | Jepsen et al. |
| 7,371,963 | B2 | 5/2008 | Suenaga et al. |
| 7,612,283 | B2 | 11/2009 | Toyomura et al. |
| 7,709,727 | B2 | 5/2010 | Roehrig et al. |
| 7,733,069 | B2 | 6/2010 | Toyomura et al. |
| 8,008,804 | B2 * | 8/2011 | Capp ............... H02J 3/30 307/44 |
| 8,067,855 | B2 | 11/2011 | Mumtaz et al. |
| 8,963,518 | B2 | 2/2015 | Wolfs |
| 9,065,295 | B2 * | 6/2015 | Capp ............... H02J 3/30 |
| 9,847,641 | B2 * | 12/2017 | Capp ............... H02J 3/30 |
| 2001/0011881 | A1 | 8/2001 | Emori et al. |
| 2002/0038667 | A1 | 4/2002 | Kondo et al. |
| 2002/0044473 | A1 | 4/2002 | Toyomura et al. |
| 2002/0047309 | A1 | 4/2002 | Droppo et al. |
| 2002/0063552 | A1 | 5/2002 | Arakawa |
| 2002/0078991 | A1 | 6/2002 | Nagao et al. |
| 2002/0105765 | A1 | 8/2002 | Kondo et al. |
| 2003/0002303 | A1 | 1/2003 | Riggio et al. |
| 2003/0038612 | A1 | 2/2003 | Kutkut |
| 2003/0047207 | A1 | 3/2003 | Aylaian |
| 2003/0075211 | A1 | 4/2003 | Makita et al. |
| 2003/0080741 | A1 | 5/2003 | LeRow et al. |
| 2003/0090233 | A1 | 5/2003 | Browe |
| 2003/0201674 | A1 | 10/2003 | Droppo et al. |
| 2003/0206424 | A1 | 11/2003 | Jungreis et al. |
| 2003/0223257 | A1 | 12/2003 | Onee |
| 2004/0076028 | A1 | 4/2004 | Achleitner et al. |
| 2004/0125618 | A1 | 7/2004 | De Rooij et al. |
| 2004/0201933 | A1 | 10/2004 | Blanc |
| 2004/0207366 | A1 | 10/2004 | Sung |
| 2005/0002214 | A1 | 1/2005 | Deng et al. |
| 2005/0006958 | A1 | 1/2005 | Dubovsky |
| 2005/0077881 | A1 * | 4/2005 | Capp ............... H02J 3/30 322/29 |
| 2005/0162121 | A1 | 7/2005 | Chan |
| 2005/0172995 | A1 | 8/2005 | Rohrig et al. |
| 2005/0225090 | A1 | 10/2005 | Wobben |
| 2005/0226017 | A1 | 10/2005 | Kotsopoulos et al. |
| 2005/0275386 | A1 | 12/2005 | Jepsen et al. |
| 2006/0192540 | A1 | 8/2006 | Balakrishnan et al. |
| 2007/0019613 | A1 | 1/2007 | Frezzolini |
| 2007/0133241 | A1 | 6/2007 | Mumtaz et al. |
| 2010/0264736 | A1 | 10/2010 | Mumtaz et al. |

(56) References Cited

U.S. PATENT DOCUMENTS

| | | | |
|---|---|---|---|
| 2013/0234518 A1 | 9/2013 | Mumtaz et al. | |
| 2015/0380939 A1* | 12/2015 | Capp | H02J 3/30 322/4 |
| 2018/0069399 A1* | 3/2018 | Capp | H02J 3/30 |

FOREIGN PATENT DOCUMENTS

| | | |
|---|---|---|
| CA | 2394761 A1 | 6/2001 |
| CN | 1106523 A | 8/1995 |
| CN | 2284479 Y | 6/1998 |
| CN | 1262552 A | 8/2000 |
| CN | 1201157 C | 5/2005 |
| DE | 3729000 A1 | 3/1989 |
| DE | 4032569 A1 | 4/1992 |
| DE | 4325436 A1 | 2/1995 |
| DE | 4328511 A1 | 3/1995 |
| DE | 19502762 A1 | 8/1996 |
| DE | 19538946 C1 | 4/1997 |
| DE | 19609189 A1 | 9/1997 |
| DE | 19618882 A1 | 11/1997 |
| DE | 19904561 C1 | 8/2000 |
| DE | 19961705 A1 | 7/2001 |
| DE | 10136147 A1 | 2/2003 |
| EP | 0231211 A1 | 8/1987 |
| EP | 115418 B1 | 11/1988 |
| EP | 420295 A1 | 4/1991 |
| EP | 827254 A2 | 3/1998 |
| EP | 0843822 B1 | 5/1998 |
| EP | 0895146 A1 | 2/1999 |
| EP | 947904 A2 | 10/1999 |
| EP | 0947905 A2 | 10/1999 |
| EP | 1024575 A2 | 8/2000 |
| EP | 1035640 A1 | 9/2000 |
| EP | 1039620 A2 | 9/2000 |
| EP | 1143594 A2 | 10/2001 |
| EP | 1193804 A2 | 4/2002 |
| EP | 1239576 A2 | 9/2002 |
| EP | 1 260 709 A1 | 11/2002 |
| FR | 2819653 A1 | 7/2002 |
| GB | 1261838 A | 1/1972 |
| JP | H04364378 A | 12/1992 |
| JP | H08185235 A | 7/1996 |
| JP | H1075580 A | 3/1998 |
| JP | H10201105 A | 7/1998 |
| JP | 11041832 A | 2/1999 |
| JP | 11103538 A | 4/1999 |
| JP | 11206038 A | 7/1999 |
| JP | 11318042 A | 11/1999 |
| JP | 2000-112545 A | 4/2000 |
| JP | 2000-116010 A | 4/2000 |
| JP | 2000166097 A | 6/2000 |
| JP | 2000174307 A | 6/2000 |
| JP | 2000307144 A | 11/2000 |
| JP | 2000316282 A | 11/2000 |
| JP | 2000347753 A | 12/2000 |
| JP | 2000358330 A | 12/2000 |
| JP | 2001224142 A | 8/2001 |
| JP | 2002073184 A | 3/2002 |
| JP | 2002354677 A | 12/2002 |
| JP | 2003134661 A | 5/2003 |
| JP | 2003134667 A | 5/2003 |
| JP | 2004055603 A | 2/2004 |
| JP | 2004-096090 A | 3/2004 |
| JP | 2004-334704 A | 11/2004 |
| JP | 2005-276942 A | 10/2005 |
| JP | 2005-312287 A | 11/2005 |
| NL | 1011483 C2 | 9/2000 |
| WO | 96/09677 A1 | 3/1996 |
| WO | 1996007130 A1 | 3/1996 |
| WO | 99/27629 A1 | 6/1999 |
| WO | 00/21178 A1 | 4/2000 |
| WO | 2000074200 A1 | 12/2000 |
| WO | 02093655 A1 | 11/2002 |
| WO | 03012569 A1 | 2/2003 |
| WO | 2003036776 A1 | 5/2003 |

OTHER PUBLICATIONS

Office Action U.S. Appl. No. 13/785,857, dated Jun. 6, 2013.
Partial Extended European Search Report, EP Application 04753488.8, dated Feb. 2, 2015.
Extended European Search Report, EP Application 04753488.8, dated Apr. 29, 2015.
The International Search Report (Form PCT /ISA/220) Issued in corresponding international application No. PCT/US04/16668, filed May 27, 2004.
Wiles, John, "Photovoltaic Power Systems and the National Electrical Code: Suggested Practices," Sandia National Laboratories, document No. SAND2001-0674, Mar. 2001.
Oct. 3-7, 1999—Matsui, et al., "A New Maximum Photovoltaic Power Tracking Control Scheme Based on Power Equilibrium at DC Link", IEEE, 1999, pp. 804-809.
Sep. 16-19, 1996—Quaschning, "Cost Effectiveness of Shadow Tolerant Photovoltaic Systems", Berlin University of Technology, Institute of Electrical Energy Technology, Renewable Energy Section. EuroSun '96, pp. 819-824.
Sep. 7-9, 1999—Lindgren, "Topology for Decentralised Solar Energy Inverters with a Low Voltage AC-Bus", Chalmers University of Technology, Department of Electrical Power Engineering, EPE '99—Lausanne.
Enslin, "Integrated Photovoltaic Maximum Power Point Tracking Converter", IEEE Transactions on Industrial Electronics, vol. 44, No. 6, Dec. 1997, pp. 769-773.
Wallace, et al., "DSP Controlled Buck/Boost Power Factor Correction for Telephony Rectifiers", Telecommunications Energy Conference 2001, INTELEC 2001, Twenty-Third International, Oct. 18, 2001, pp. 132-138.
John Xue, "PV Module Series String Balancing Converters", University of Queensland—School of Information Technology & Electrical Engineering, Nov. 6, 2002.
Sandia Report SAND96-2797 I UC-1290 Unlimited Release, Printed Dec. 1996, "Photovoltaic Power Systems and The National Electrical Code: Suggested Practices", by John Wiles, Southwest Technology Development Institute New Mexico State University Las Cruces, NM.
Nayar, C.V., M. Ashari and W.W.L Keerthiphala, "A Gridinteractive Photovoltaic Uninterruptible Power Supply System Using Battery Storage and a Back up Diesel Generator", IEEE Transactions on Energy Conversion, vol. 15, No. 3, Sep. 2000, pp. 348?353.
Yeong-Chau Kuo et al., Novel Maximum-Power-Point-Tracking Controller for Photovoltaic Energy Conversion System, IEEE Transactions on Industrial Electronics, vol. 48, No. 3, Jun. 2001.
Woyte, et al., "Mains Monitoring and Protection in a European Context", 17th European Photovoltaic Solar Energy Conference and Exhibition, Munich, Germany, Oct. 22-26, 2001, ACHIM, Woyte, et al., pp. 1-4.
Meinhardt, Mike, et al., "Multi-String-Converter with Reduced Specific Costs and Enhanced Functionality," Solar Energy, May 21, 2001, pp. 217-227, vol. 69, Elsevier Science Ltd.
Calais, Martina, et al. "Inverters for single-phase grid connected photovoltaic systems—an overview." Power Electronics Specialists Conference, 2002. pesc 02. 2002 IEEE 33rd Annual. vol. 4. IEEE, 2002.
Gow Ja A et al: "A Modular DC-DC Converter and Maximum Power Tracking Controller Formedium to Large Scale Photovoltaic Generating Plant" 8<SUP>th </SUP> European Conference on Power Electronics and Applications. Lausaane, CH, Sep. 7-9, 1999, EPE. European Conference on Power Electronics and Applications, Brussls: EPE Association, BE, vol. Conf. 8, Sep. 7, 1999, pp. 1-8, XP000883026.
Walker, "Cascaded DC-DC Converter Connection of Photovoltaic Modules", 33rd Annual IEEE Power Electronics Specialists Conference. PESC 2002. Conference Proceedings. Cairns, Queensland, Australia, Jun. 23-27, 2002; [Annual Power Electronics Specialists

(56) References Cited

OTHER PUBLICATIONS

Conference], New York, NY: IEEE US, vol. 1, Jun. 23, 2002, pp. 24-29, XP010596060 ISBN: 978-0-7803-7262-7, figure 1.
Caselitz, Control and Power Conditioning for Photovoltaic Power Supply Systems, PVSEC, Oct. 1986.
Cramer, Modulorientierter Stromrichter, Juelich, Dec. 31, 1995.
Cramer, String-Wechselrichter Machen Solarstrom Billiger, Elektronik, Sep. 1996.
Dick, Multi-Resonant Converters as Photovoltaic Module-Integrated Maximum Power Point Tracker, RWTH Aachen, May 17, 2010.
Engler, Begleitende Untersuchungen zur Entwicklung eines Multi-String-Wechselrichters, SPVSE, Mar. 2002.
Geipel, Untersuchungen zur Entwicklung modulorientierter Stromrichter Modulorientierter Stromrichter für hetzgekoppelte Photovoltaik-Anlagen, SPVSE, 1995.
Gow, Modelling, simulation and control of photovoltaic converter systems, Laughbrough University, Jan. 1998.
Green, Silicon Solar Cells With Integral Bypass Diodes, 1981.
Herrmann, Low Cost DC to AC Converter for Photovoltaic Power Conversion in Residential Applications, IEEE 1993.
Hua, Study of Maximum Power Tracking Techniques and Control of DC/DC Converters for Photovoltaic Power System, PESC, 1998.
Huang, A New Microcontroller based Solar Energy Conversion Modular Unit, PCC, 1997.
Koutroulis, Development of a Microcontroller-Based, Photovoltaic Maximum Power Point Tracking Control System, IEEE, Jan. 2001.
Langridge, Development of a Photo-Voltaic Pumping System Using a Brushless D.C. Motor and Helical Rotor Pump, Solar Energy, 1996.
Naik, A Novel Grid Interface for Photovoltaic, Wind-Electric, and Fuel-Cell Systems With a Controllable Power Factor of Operation, IEEE, 1995.
Niebauer, Solarenergie Optimal Nutzen, Stromversorgung, Elektronik, 1996.
Noguchi, Short-Current Pulse-Based Maximum-Power-Point Tracking Method for Multiple Photovoltaic-and-Converter Module System, IECON, Feb. 2002.
Simoes, Drive: System Control and Energy Management of a Solar Powered Electric Vehicle, APEC, 1998.
Simoes, A RISC-Microcontroller Based Photovoltaic System for Illumination Applications, APEC, 2000.
Siri, Maximum Power Tracking in Parallel Connected Converters, IEEE, Jul. 1993.
Solero, Performance of a 10 kW Power Electronic Interface for Combined Wind/PV Isolated Generating Systems, PESC, 1996.
Ulleberg, TRNSYS Simulation Models for Solar-Hydrogen Systems, Solar Energy 1997.
Viotto, Solarmodule mit integriertem Wechselrichter, FVS 2003.
Whitcomb, Design and Implementation of a High-Power Resonant DC-DC Converter Module for a Reduced-Scale Prototype Integrated Power System, Naval School Thesis, Sep. 2001.
Wu, An Improved Dynamic Power Distribution Control Scheme for PWM Controlled Converter Modules, IEEE, 1992.
Jan. 7, 2019—EP Office Action—04753488.8.

\* cited by examiner

POWER CONVERTER FOR A SOLAR PANEL

The present application is a continuation of U.S. application Ser. No. 16/162,574, entitled "POWER CONVERTER FOR A SOLAR PANEL" filed Oct. 17, 2018, which is a continuation of U.S. application Ser. No. 15/052,633, entitled "POWER CONVERTER FOR A SOLAR PANEL" filed Feb. 24, 2016, which is a continuation of U.S. application Ser. No. 13/282,037, entitled "POWER CONVERTER FOR A SOLAR PANEL" filed Oct. 26, 2011, which is a continuation of U.S. National Stage application Ser. No. 10/556,764, entitled "POWER CONVERTER FOR A SOLAR PANEL" filed Oct. 17, 2006, which claims priority to International Application PCT/US04/16668, filed May 27, 2004, which claims priority to U.S. Provisional Application No. 60/473,749, entitled "Power converter for integration in a solar panel and systems related thereto" filed May 28, 2003. These applications are hereby incorporated by reference in their entirety.

BACKGROUND OF THE INVENTION

1. Field of the Invention

The subject disclosure relates to systems for utilizing power generated by solar panels, and more particularly to an improved system for converting the power generated by a solar panel to improve safety and efficiency.

2. Background of the Related Art

In the modern world, the needs for electrical power are ubiquitous. However, many of the sources of electrical power such as nuclear energy and coal or fossil fuel power generation plants are not always feasible, and generate not only power but excessive pollution, exhaustion of resources and controversy. In an effort to avoid these drawbacks by utilizing the renewable energy of the sun, photovoltaic solar panel arrays are finding expanded use in the home environment and industry. Solar panel arrays are particularly well-suited to stand alone applications in isolated regions. Solar panel arrays not only function as an alternate energy source but excess power can be sold back to utility companies or stored for later use.

Referring to FIG. 1, a conventional home system is referred to generally by the reference numeral 10. The system 10 includes a solar panel array or solar array 20 mounted on a roof 22 and electrically connected to a control system 40. By mounting the solar array 20 on the roof 22, a maximum amount of sunlight, represented by arrows 24, without interference from trees, buildings or other obstructions is more likely. The control system 40 is typically stored within the basement of the house, and provides power to the load 26. The load 26 may also receive power from the utility grid 28 in a conventional manner.

The solar array 20 has a plurality of solar modules 30a-n which are comprised of a number of solar cells. Depending on the number of modules 30a-n, the system 10 can have a capacity from a few kilowatts to a hundred kilowatts or more. Typically, the number of modules is somewhat matched to meet the demands of the load because each module 30 represents a significant investment. Moreover, the roof 22 has limited area for conveniently and practically retaining the modules 30. Commonly, a module 30 consists of 36 photovoltaic cells which produce an open circuit voltage (OCV) of 21 to 23 VDC and a max power point voltage of 15 to 17 VDC. Standard power ratings for the solar modules 30 range from 50 W to 150 W. Thus, for an exemplary system 10, where two kilowatts are desired, as many as forty modules 30 may be needed.

For the most part, the prior art solar modules 30 are somewhat limited by their performance characteristics. In view of this, attempts have been made to optimize the solar module usage so that fewer solar modules 30 or less space are required. Tracking mechanisms have been added to actively orient each solar module 30 so that the incident sunlight is normal to the solar module 30 for increased efficiency. Other attempts at increasing efficiency and applicability of roof mounted solar arrays 20 have involved creating turrets to reduce the footprint thereof. Despite these attempts, solar arrays 20 are still uncommon and underutilized because of the additional expense and complexity these methods provide. As a result, the drawbacks of capacity and expense need to be overcome otherwise the range of practical applications for power from a solar arrays 20 will continue to be limited.

A common method for mounting a solar array 20 on the roof 22 is to mount each solar panel 30 individually and directly onto the surface of the roof 22. This method usually involves the installers carrying each solar panel 30 up to the roof and mounting them one at a time. Usually, the solar modules 30 are put into groups to form panels which, in turn, can be used to form the solar array 20. Solar modules 30 are live, i.e. outputting power, during installation. On a sunny day, the power generation can pose a safety hazard to the installers. There is a need, therefore, for an improved solar module control system which forces an improved module into a default off mode with no power output when not in use. Thus, adequate safety can be assured during installation and at other times of disconnection such as during replacement and repair.

Referring still to FIG. 1, an electrical conduit or conduits (not shown) carry the wiring that electrically interconnects the solar array 20 with the control system 40. The power output of each module 30 is carried individually to a string combiner 42 within the control system 40. Typically, the electrical conduit carries the outputs of the solar array 20 in a low voltage, high current bundle. As the size of the solar, array 20 increases, the thickness of the bundle and, in turn, the electrical conduit increases. As a result, the elect conduit is not only unsightly but represents significant danger if exposed. Thus, there is a need for a solar panel array which provides a high voltage and low current output that can be carried in relatively small cables which pose a minimal safety risk.

The control system 40 includes a central inverter 44 for changing the raw power from the string combiner 42 into usable power for the load 26. The central inverter 44 includes a matching DC/DC converter 46 and an AC/DC converter 48. An optional battery 50 is also shown disposed between the matching DC/DC converter 46 and the AC/DC converter 48 for use in an off grid system or as part of an uninterruptable power supply (hereinafter "UPS"). The matching converter 46 drops the raw solar array power down from the string combiner 42 to a desired level. When a battery 50 is used, the typical desired level of voltage is 54V. Thus, the power generated by the solar array 20 may be stored in the battery for use during the night or fed to the AC/DC converter 48 for use by the load 26 or sale via the utility grid 28. The AC/DC converter 48 receives the 54 VDC power and outputs an AC current at a desired voltage and frequency such as for example 120, 208 or 240 VAC at 50 or 60 Hz. Converters 46, 48 are well known to those of ordinary skill in the pertinent art and, therefore, not further described herein.

The matching converter 46 may also include maximum power point tracking (hereinafter "MDPT") for varying the electrical operating point so that the solar array 20 delivers the maximum available power. This and other techniques for effectively using power generated by solar arrays are common. An example is illustrated in U.S. Pat. No. 6,046,919 to Madenokouji et al, and is incorporated herein by reference. From the foregoing, it may be observed that the MDPT optimizes the solar array 20 as a monolithic unit.

In actuality, the solar array 20 is made up of solar modules 30 that each typically includes thirty-two cells divided into two groups of sixteen. Each of the solar module cells and solar modules 30 may be from different manufacturers and have varied performance characteristics. Moreover, shading by clouds and the like varies the output from cell to cell and module 30 to module 30. Thus, significant improvements in the efficiencies of the solar panels 30 can be realized if each solar module 30 can be operated at peak power levels. Similarly, each group of sixteen cells or even each cell's performance can be enhanced by corresponding optimization. Such performance would permit solar arrays with less panels to reduce the cost of a given installation and broaden the range of practical applications for solar power. There is a need, therefore, for a cost effective and simple control system which can greatly increase efficiency in new and existing solar arrays.

Further, the typical solar array 20 has a variable output not only throughout the day but the output voltage also varies according to other parameters such as temperature. As a result, the central inverter 44 is also required to be a variable regulator to control these variations. In the United States, galvanic isolation is required for connection to the utility grid 28. The galvanic isolation is usually achieved by a 60 Hz transformer on the output of the central inverter 44. These prior art necessities further increase the cost and complexity of the control system 40. A solar array which does not need the central inverter 44 to act as a variable regulator or galvanic isolation would advantageously reduce the cost and complexity of the control system.

Further still, solar arrays 20 that are configured for grid connect only (without UPS function available) operate only while the utility grid 28 is on. In a problematic manner, if a utility grid outage occurs, the power generated by the solar array 20 cannot be accessed to run the load 26. Even for periodic outages lasting for only seconds, requirements are such that the solar array 20 cannot be reconnected for five minutes after the utility grid power has returned. Thus, a need exists for a solar array control unit which can supply power to the load even when a utility grid outage occurs.

SUMMARY OF THE INVENTION

The present invention is directed to a control unit for controlling an output of a solar module. The control unit includes a converter for coupling to the output of the solar module, the converter being configured and arranged to convert the output to a high voltage and low current.

It would be desirable to provide a solar array with increased capacity, for a given size, whale reducing the complexity and expense so that solar power may be used more economically and for a wider range of applications.

It would be desirable to provide a solar panel array which optimizes the power output at a subcomponent level to increase the overall power generated.

It would be desirable to provide a control system for a solar array which can be retrofit onto existing arrays to provide increased power generation.

It would be desirable to provide a control system for a solar panel which defaults in an off mode for allowing safe installation.

It would be desirable to provide a control system which allows for utilization of the power generated by a solar array even when the grid power is down.

It would be desirable to provide a simplified control system which utilizes standard, off-the-shelf components. It would further be desirable to provide an inverter that is standard. In a further embodiment, the inverter would also provide galvanic isolation from the utility grid.

It would be desirable to provide a solar array which produces power at a relatively high voltage and low current to allow for relatively small cables to carry the power in a safe and convenient manner. It would further be desirable for the solar array power to be at a desirable DC voltage to allow use of off-the-shelf components. In one embodiment, a control unit controls an output of a solar device. The control unit includes a converter coupled to the output of the solar device such that the solar device output is converted to a high voltage and low current. Preferably, the high voltage is between approximately 200 and 600 VDC and the solar device is selected from the group consisting of a solar module, a group of solar cells and a solar cell. The converter also preferably includes MPPT.

Still another embodiment is directed to a control unit for a solar module in a solar array for maximizing the output of the solar module. The control unit includes a converter for coupling to the cells of the solar module and, thereby, maximize a power output of each cell.

Yet still another embodiment is a solar module array including a plurality of solar modules connected in parallel and a low voltage to high voltage DC/DC converter coupled to each solar module for maximizing a power output by each respective module. Preferably, the solar module array also includes a DC/AC inverter coupled to an output of the DC/DC converters for outputting a usable power to a load.

It should be appreciated that the present invention can be implemented and utilized in numerous ways, including without limitation as a process, an apparatus, a system, a device and a method for applications now known and later developed. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the drawings wherein.

DETAILED DESCRIPTION OF PREFERRED EMBODIMENTS

Figure 1:
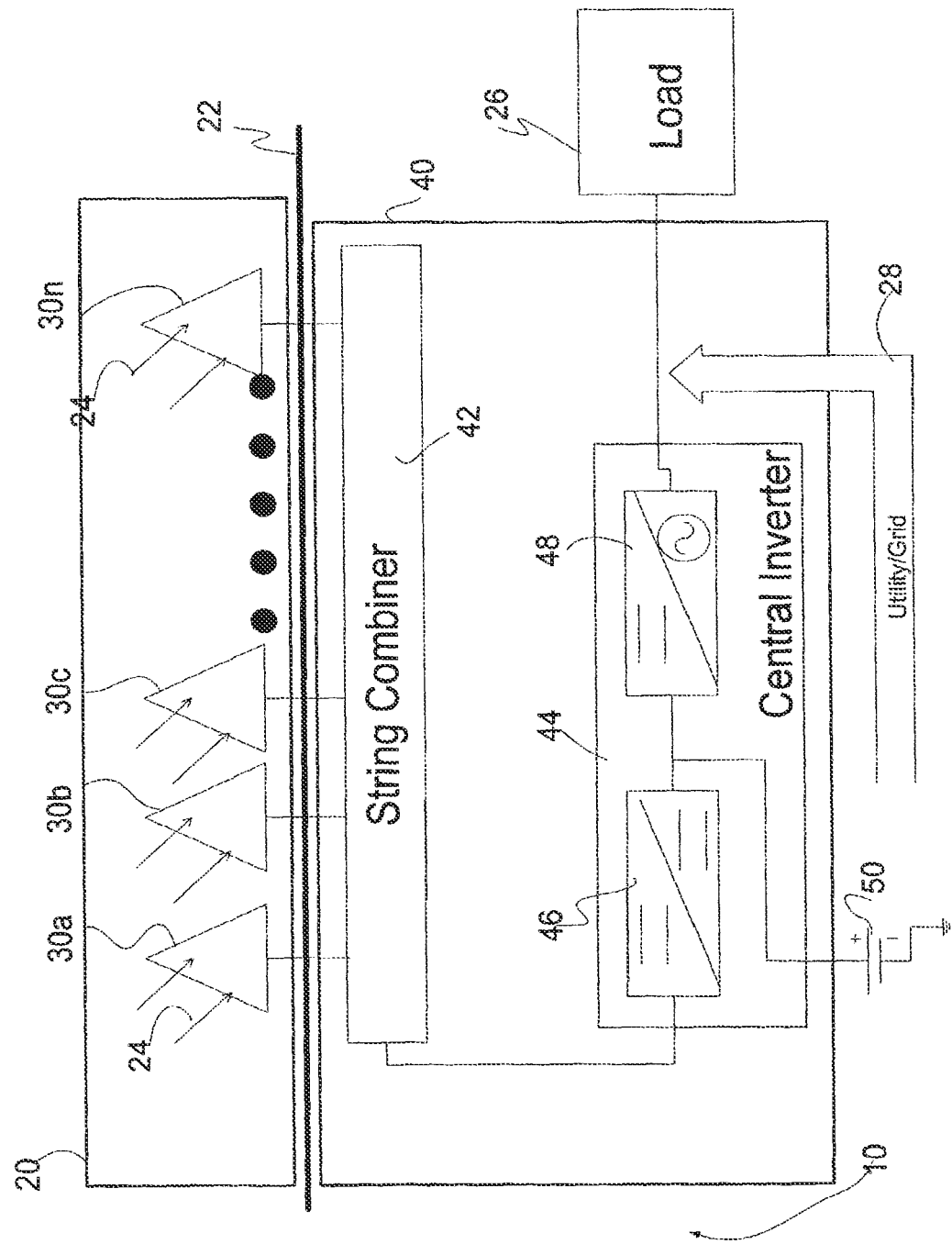
FIG. 1 is a schematic diagram of a conventional solar panel array installation.

The present invention overcomes many of the prior art problems associated with solar arrays. The advantages, and other features of the systems and methods disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

Figure 2:
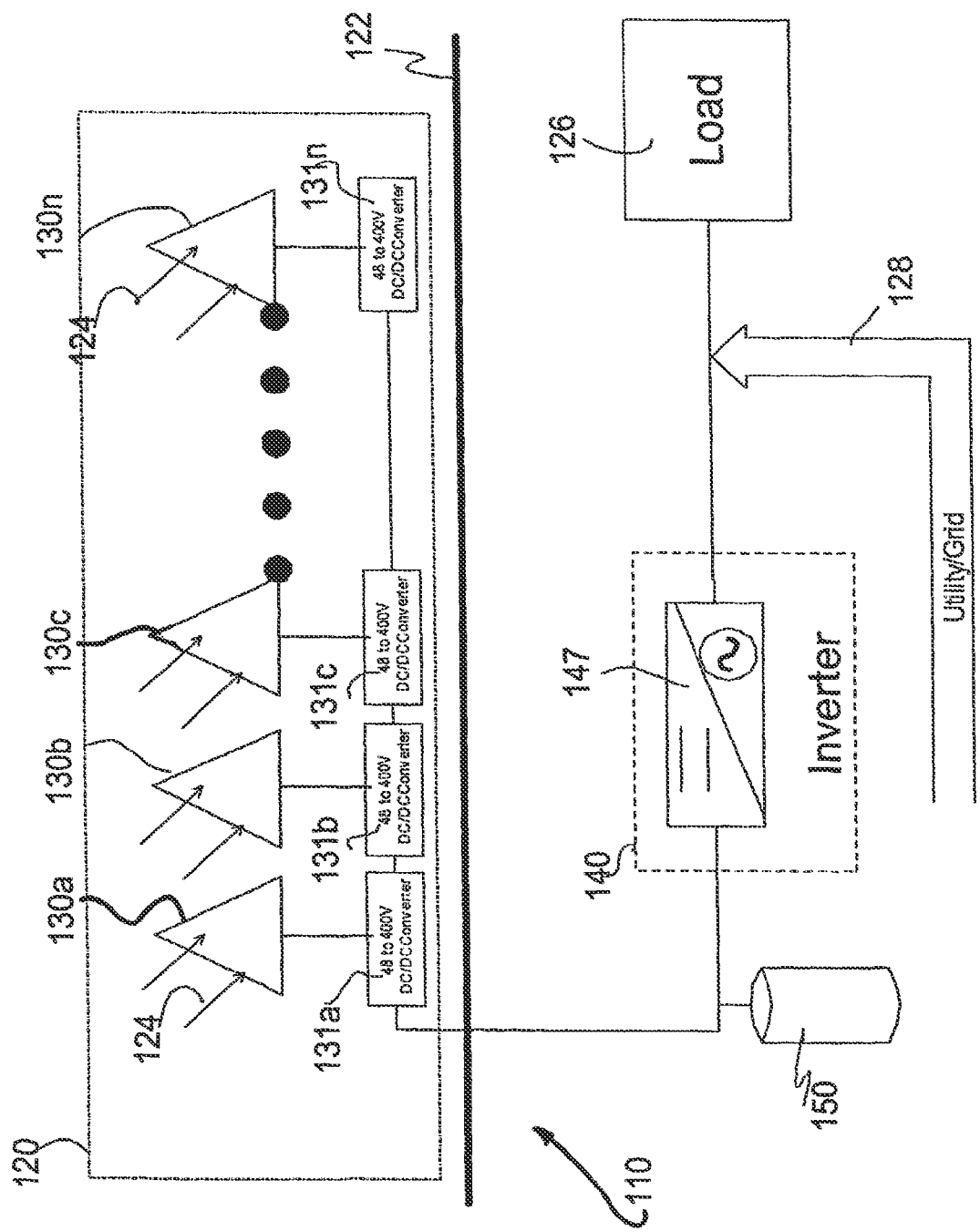
FIG. 2 is a schematic diagram of a solar panel array installation constructed in accordance with the subject disclosure.

Referring to FIG. 2, an improved solar array power generation system is referred to generally by the reference numeral 110. As will be appreciated by those of ordinary skill in the pertinent art, the system 110 utilizes some similar components as the system 10 described above. Accordingly, like reference numerals preceded by the numeral "1" are used to indicate like elements whenever possible. The system 110 includes a roof mounted solar array 120 electrically connected to a control system 140. The solar array 120 has a plurality of solar modules 130a-n. Each solar module 130a-n has a corresponding DC/DC converter 131a-n for converting the raw panel output to a nominal 400 VDC output. Thus, the modules 130 may be easily connected in parallel and, in turn, connected to the control system 140 by a relatively small, safe, high voltage, low current cable (not shown). The resulting 400 VDC level is more suitable for the creation of 120 or 240 VAC than, for example, a 12 VDC car battery. Another advantage realizable by use of the converters 131 is that relatively high switch frequencies can be employed to significantly reduce the size and filtering requirements of the system 110.

In a further embodiment, the DC/DC converters 131 include MPPT. The DC/DC converter 131 with MPPT maximizes the module output according to the present operating conditions of the solar module 130. For example, module 130a may be temporarily shaded by a cloud or object while module 130c is receiving direct sunlight. Under such circumstances, the performance characteristics of panels 130a and 130c would be different, e.g., the optimum power settings for each panel would not be the same. The corresponding DC/DC converters 131a and 131c would uniquely adjust the module's operation such that modules 130a and 130c will produce the maximum power possible individually. Accordingly, the maximum power output of the solar array 120 is maximized and fewer modules 130 may be employed to produce comparable power to prior art systems.

In a preferred embodiment, each module 130 contains thirty-two cells divided into two groups of sixteen. A diode (not shown) is commonly disposed between each group of sixteen cells to prevent reverse current flow during shady conditions and other events which may cause variation in panel output. A plurality of DC/DC converters 131 regulate the output of each group of sixteen cells of the module 130 by picking up the output at the diode. Thus, the advantages of the subject disclosure may be utilized in new and existing solar modules by retrofit. In still another embodiment, the DC/DC converters 131 are connected to maximize the output of each cell of the module 130.

In a further embodiment, the DC/DC converters 131 are also configured to require a signal from the control system 140 to output power. If the panel 130 is not receiving this signal, then the default mode of no power output is achieved. Consequently, installers can handle panels 130 on a sunny day without concern for the live power generated thereby.

The control system 140 is also improved by further simplification in the preferred system 110. The control system 140 includes a central inverter 144 having a single DC/AC inverter 147. The DC/AC inverter 147 prepares the raw power from the solar array 120 for use by the load 126 or sale to the utility company via the utility grid 128. In the preferred embodiment, the inverter 147 is a relatively simple, low dynamic range, off-the-shelf high voltage inverter for dropping the voltage down and creating the desired frequency. Since the DC/DC converters 131 regulate the power outage from the solar panels 130, the control system 140 can be optimized for efficiency since a very small input voltage range is required for operation. In an embodiment where the solar array 120 outputs 400 VDC, a standardized inverter 147 can be used to beneficially and significantly reduce the wiring complexity and, thereby, the cost of the control system 140. In a further embodiment, galvanic isolation can be maintained in the standardized inverter 147. Accordingly, the control system 140 is further simplified.

Figure 3:
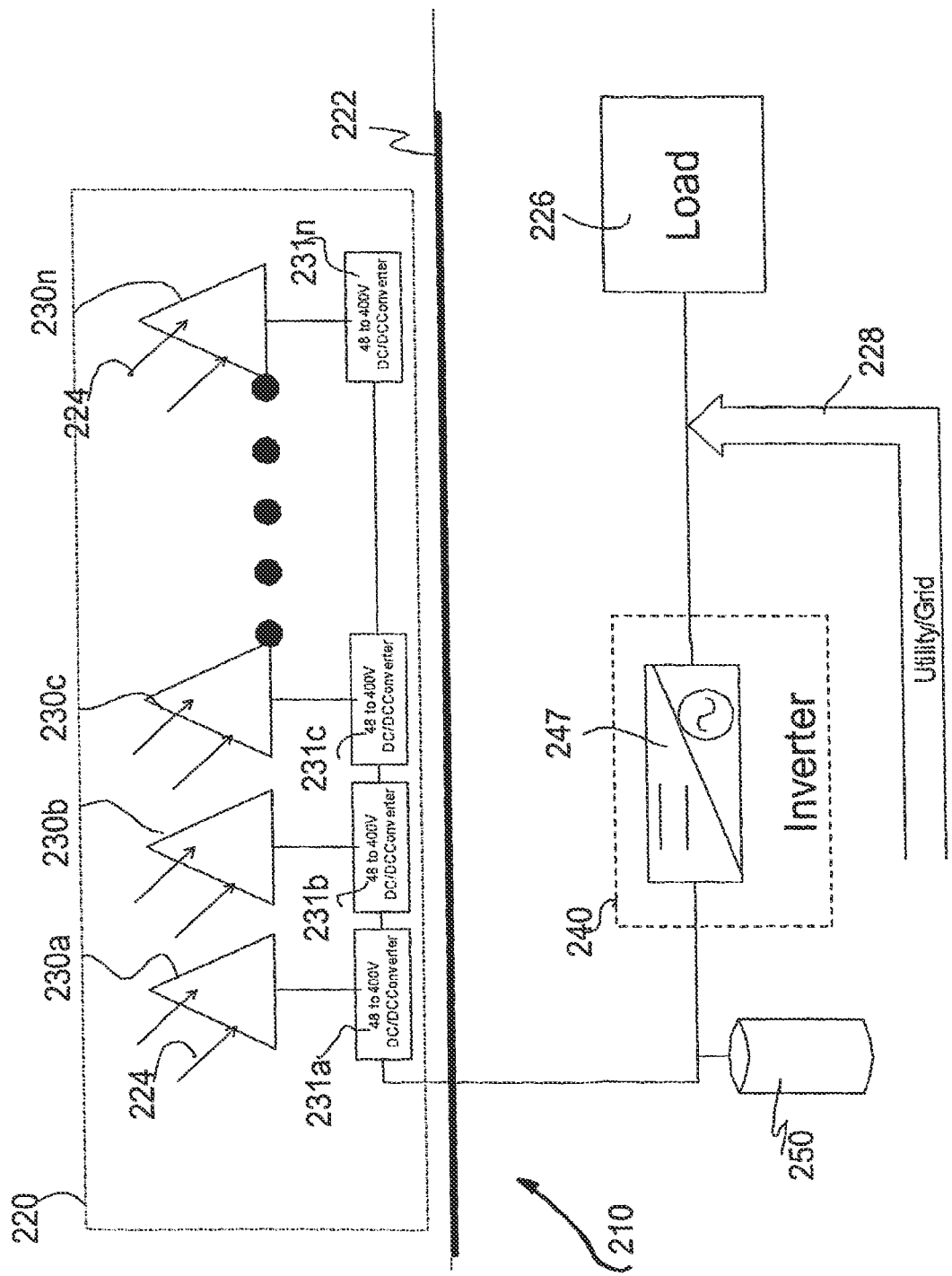
FIG. 3 is a schematic diagram of another solar panel array installation constructed in accordance with the subject disclosure.

Referring now to FIG. 3, as will be appreciated by those of ordinary skill in the pertinent art, the system 210 utilizes the same principles of the system 110 described above. Accordingly, like reference numerals preceded by the numeral "2" instead of the numeral "1", are used to indicate like elements. An optional energy storage device 250 is disposed between the control system 240 and the solar array 220. In one embodiment, the energy storage device 250 is a high voltage flywheel energy storage system which ideally operates at 400V. Accordingly, the output of the DC/AC inverter 247 is matched to optimize the operating efficiency of the high voltage flywheel. Acceptable 6 kWh high voltage energy flywheels are available from Beacon Power Corporation in Wilmington, Mass. In another embodiment, the energy storage device 250 is a conventional battery.

In still another embodiment, the energy storage device 250 is a capacitor and the system 210 acts as an uninterruptible power supply. The capacitor 250 charges during normal operation as the solar array 220 and utility grid 228 provide power to the load 226. In a system with a conventional battery, such operation would shorten the life of the battery as is known to those of ordinary skill in the pertinent art. However, with a capacitor such short life is avoided.

During an interruption of utility grid power, the capacitor discharges to provide interim power to the load 226 until an electronic switch (not shown) can be actuated to allow the solar array 220 to meet the demand of the load 226. It is envisioned that the capacitor will be able to meet the demand for at least twenty seconds although advantages would be provided by a capacitor with only a few seconds of sustained power output. Thus, the power output from the solar array 220 can still be accessed even when the utility grid 228 is down. In a further embodiment, the capacitor is what is commonly known as an electro-chemical capacitor or ultra capacitor. The capacitor may be a carbon-carbon configuration, an asymmetrical carbon-nickel configuration or any suitable capacitor now known or later developed. An acceptable nominal 48V, 107 F ultra capacitor is available from ESMA of the Troitsk Moscow Region in Russia, under model no. 30EC104U.

In another embodiment, an alternative energy source such as a conventional fuel burning generator, fuel cell or other suitable alternative acts as a backup in combination with a solar array.

While the invention has been described with respect to preferred embodiments, those skilled in the art will readily appreciate that various changes and/or modifications can be made to the invention without departing from the spirit or scope of the invention as defined by the appended claims.

The invention claimed is:

1. A method comprising:
   monitoring, by a photovoltaic module, for a control signal;

operating, in absence of the control signal, the photovoltaic module in a default mode of operation; and operating, in response to receiving the control signal, the photovoltaic module in a normal mode of operation;

wherein the default mode of operation comprises outputting substantially no power, and wherein the normal mode of operation comprises drawing input power from a photovoltaic power source and providing output power.

2. The method of claim 1 wherein the default mode of operation comprises outputting a safe voltage.

3. The method of claim 2, further comprising tracking, in the normal mode of operation, maximum power at an input of a power converter of the photovoltaic module.

4. The method of claim 1, further comprising converting, in the normal mode of operation, an input voltage to an output voltage that is higher than the input voltage.

5. The method of claim 4, further comprising operating in a backup mode of operation, wherein the backup mode of operation comprises providing, in case of a grid outage, backup power to a load.

6. The method of claim 1, further comprising:
receiving, by an inverter, the output power provided by the photovoltaic module; and
converting the output power to an AC power.

7. The method of claim 6, further comprising providing, by the inverter, the control signal.

8. The method of claim 7, further comprising drawing, by the inverter, stored power from an energy storage device connected to the inverter.

9. The method of claim 8, further comprising:
after drawing, by the inverter, the stored power from the energy storage device, drawing backup power from the photovoltaic module.

10. The method of claim 8, wherein the receiving the control signal comprises:
receiving the control signal from the inverter.

11. A system comprising:
a photovoltaic array comprising a plurality of photovoltaic modules, wherein a photovoltaic module of the plurality of photovoltaic modules is configured to:
monitor for a control signal;
operate, in absence of the control signal, in a default mode of operation; and
operate, in response to receiving the control signal, in a normal mode of operation;
wherein in the default mode of operation, the photovoltaic module is configured to output substantially no power, and wherein in the normal mode of operation, the photovoltaic module is configured to draw input power from a photovoltaic power source and provide output power.

12. The system of claim 11, wherein the photovoltaic module is configured to, in the default mode of operation, output a safe voltage.

13. The system of claim 11, wherein the photovoltaic module is configured to, in the normal mode of operation, carry out Maximum Power Point Tracking.

14. The system of claim 11, wherein the photovoltaic module is configured to, in the normal mode of operation, convert an input voltage to an output voltage that is higher than the input voltage.

15. The system of claim 11, wherein the photovoltaic module is configured to operate in a backup mode of operation and wherein in the backup mode of operation, the photovoltaic module is configured to provide, in case of a grid outage, backup power to a load.

16. The system of claim 11, further comprising an inverter configured to:
receive the output power provided by the photovoltaic module; and
convert the output power to an AC power.

17. The system of claim 16, wherein the inverter is configured to receive an inverter input voltage and to create an output AC voltage having an amplitude that is lower than the inverter input voltage.

18. The system of claim 16, wherein the inverter is configured to provide the control signal.

19. The system of claim 16, further comprising an energy storage device connected to the inverter, wherein the inverter is configured to:
draw stored power from the energy storage device; and
draw backup power from the photovoltaic module.

20. The system of claim 19, wherein the energy storage device comprises a battery.

21. The system of claim 16, further comprising an energy storage device connected to the inverter, wherein the inverter is configured to:
draw stored power from the energy storage device; and
provide the stored power to a load.

22. The system of claim 21, wherein the inverter is configured to provide the stored power to the load in response to a grid outage.

23. The system of claim 21, wherein the energy storage device comprises a battery.

24. The system of claim 21, wherein the inverter is configured to draw interim power from the energy storage device until the photovoltaic array can provide power to the load.

25. The system of claim 11, wherein the photovoltaic module comprises a plurality of solar cells.

26. The system of claim 11, wherein the photovoltaic module comprises a DC/DC converter.

27. The system of claim 11, wherein the plurality of photovoltaic modules are connected in parallel.

* * * * *